United States Patent
Brown

(10) Patent No.: US 8,697,588 B2
(45) Date of Patent: Apr. 15, 2014

(54) MINERAL WOOL FROM RECYCLABLE MATERIALS

(75) Inventor: Martin W. Brown, Gurnee, IL (US)

(73) Assignee: USG Interiors, Inc., Chicago, IL (US)

( * ) Notice: Subject to any disclaimer, the term of this patent is extended or adjusted under 35 U.S.C. 154(b) by 249 days.

(21) Appl. No.: 13/084,349

(22) Filed: Apr. 11, 2011

(65) Prior Publication Data

US 2011/0251043 A1 Oct. 13, 2011

Related U.S. Application Data

(60) Provisional application No. 61/323,164, filed on Apr. 12, 2010.

(51) Int. Cl.
| | |
|---|---|
| *C03C 13/06* | (2006.01) |
| *C03C 13/00* | (2006.01) |
| *C03C 6/02* | (2006.01) |
| *C03C 3/087* | (2006.01) |
| *C03C 1/00* | (2006.01) |

(52) U.S. Cl.
CPC ............... *C03C 13/06* (2013.01); *C03C 1/002* (2013.01); *C03C 3/087* (2013.01)
USPC ............ 501/36; 501/35; 501/27; 501/28; 501/29; 501/69; 501/70

(58) Field of Classification Search
CPC .......... C03C 13/06; C03C 1/002; C03C 3/087
USPC ........... 501/27, 28, 29, 32, 36, 35, 69, 70
See application file for complete search history.

(56) References Cited

U.S. PATENT DOCUMENTS

| | | | |
|---|---|---|---|
| 2,020,403 A | 6/1933 | Engle | |
| 4,287,142 A | 9/1981 | Holbek | |
| 4,617,045 A * | 10/1986 | Bronshtein | ................. 65/474 |
| 4,720,295 A | 1/1988 | Bronshtein | |
| 5,434,333 A | 7/1995 | Jantzen et al. | |
| 5,691,255 A | 11/1997 | Jensen et al. | |
| 5,709,728 A | 1/1998 | Fleckenstein et al. | |
| 5,811,360 A * | 9/1998 | Jubb | .............................. 501/35 |
| 5,932,500 A * | 8/1999 | Jensen et al. | .................... 501/36 |
| 5,968,648 A * | 10/1999 | Rapp et al. | .................... 428/357 |
| 6,074,967 A | 6/2000 | Erskine | |
| 6,458,436 B1 * | 10/2002 | Hansen et al. | ............... 428/34.5 |
| 6,698,245 B1 | 3/2004 | Christensen et al. | |
| 2002/0000100 A1 | 1/2002 | Burg et al. | |
| 2008/0014422 A1 | 1/2008 | Keller et al. | |

FOREIGN PATENT DOCUMENTS

| | | |
|---|---|---|
| DE | 19840497 | 2/2000 |
| EP | 0959050 | 11/1999 |
| WO | WO 0040517 | 7/2000 |

OTHER PUBLICATIONS

Derwent Abstract of 1999-622086, abstract of EP 959050 A1, Nov. 24, 1999.*
USG Mineral Wool, A superior mineral wool for multiple applications, Jul. 2009.*
Knudsen, T, "New Type of Stonewood (HT Fibres) with a High Dissolution Rate at PH = 4.5", Glass Science and Technology, Deutsche Glastechnische Gesellschaft, Offrenbach, DE, vol. 69, No. 10, Oct. 1, 1996, pp. 331-337.

* cited by examiner

*Primary Examiner* — Karl Group
*Assistant Examiner* — Elizabeth A Bolden
(74) *Attorney, Agent, or Firm* — Greer, Burns & Crain, Ltd.; Pradip Sahu; Philip T. Petti

(57) ABSTRACT

Provided is a mineral wool that includes recycled material. The mineral wool is characterized by an acid to base ratio within a specified range. Also provided is a method of manufacturing the mineral wool that includes selection of post-consumer or post-industrial recyclable materials. Application of the mineral wool to products such as an acoustical ceiling panel is also provided.

10 Claims, No Drawings

MINERAL WOOL FROM RECYCLABLE MATERIALS

RELATED APPLICATION

This application claims priority pursuant to 35 U.S.C. 119 (e) from U.S. Provisional Application Ser. No. 61/323,164 filed Apr. 12, 2010.

BACKGROUND

The present invention relates generally to forming man-made fibers and particularly to forming a mineral wool.

Mineral wool is a fiber made from natural or synthetic minerals or metal oxides. Industrial applications of mineral wool include thermal insulation, filtration, and soundproofing.

The process of manufacturing mineral wool generally involves combining a number of ingredients, also referred to as components or starting materials, into a furnace, such as a cupola. Conventional ingredients include blast furnace slag, virgin minerals and coke as a fuel. One manufacturing technique involves heating the furnace to a high temperature, for example, in the range of 1400-2000° C., and preferably 1600° C., phase-changing, or melting, the ingredients to form a liquid, and blowing a stream of air or steam through the liquid using a wheeled spinner as is well known in the art. The final product is a mass of fine, intertwined, nonwoven fibers.

In conventional mineral wool, components are typically selected and proportioned in a way that maintains a target acid-to-base (A/B) ratio of the constituent fibers. The A/B ratio is a key parameter because it indicates fiber solubility, or how readily the fibers dissolve in bodily fluids, such as blood and saliva. This is an important characteristic for reasons having to do with human health, because these materials are likely to come into contact with humans as a result of their use in building construction materials.

Examples of virgin minerals conventionally used as starting materials in mineral wool production are quartzite and granite. In some cases, the virgin minerals constitute a relatively high proportion of the starting materials by dry weight. The use of such virgin minerals in the production of mineral wool is currently less desirable due to a trend in the building construction industry toward conservation of resources and recycling of materials.

SUMMARY

The above-identified issues of conventional mineral wool are addressed by the present mineral wool and related method of production. By substituting natural or virgin mineral with recyclable materials, the environmental value of the present mineral wool has been significantly increased compared to conventional mineral wool. In the present mineral wool, recycled construction materials such as concrete, brick chips, waste glass, furnace slag and the like replace virgin minerals such as quartzite and granite. Using recyclable materials is encouraged by the U.S. Green Building Council, a Washington, D.C.-based nonprofit coalition, and its Leadership in Energy and Environmental Design (LEED) program. By contributing to a higher LEED rating, the present mineral wool enhances a positive public image of this common construction material. Products manufactured with the present improved mineral wool, or fibrous wool, also have value added because of the product's ability to improve the LEED rating of a building.

More specifically, a mineral wool is provided that includes recycled material and has an acid to base ratio within a specified range. In another embodiment, a method of forming the mineral wool is provided, including selecting a recyclable material, combining a plurality of starting materials including the recyclable material and processing the combined starting materials to form the mineral wool having an acid-to-base ratio in a specified range. Included in the general processing steps are heating the combined starting materials to form a liquid, and blowing the liquid as it cools to form the mineral wool material.

The above process is also known as "spinning" the mineral wool. Mineral wool may also be referred to as "spun," "spun wool" or "spun fibers."

In still another embodiment, a ceiling tile or panel is provided with desirable sound absorption properties. Also known as an acoustic ceiling tile or panel, the present panel is made from the present mineral wool.

DETAILED DESCRIPTION

A mineral wool is provided that includes a recycled material which replaces virgin minerals. Due to incorporation of the recycled material or materials, the present mineral wool is rated with a high LEED score, thereby providing a desirable improvement over conventional mineral wool. Preferably, recyclable materials, also referred to as recyclables, for making a high LEED mineral wool include, but are not limited to, slag, post-consumer concrete, brick chips, waste glass, foundry sand and combinations of these materials.

Utilizing recyclable materials in mineral wool production to manufacture the present mineral wool is desirable because it helps conserve natural material resources, it usually consumes far less energy than extracting and processing virgin minerals or other natural resources, and it helps keep usable materials from becoming a disposal or pollution problem. Recyclables encompass post-industrial and post-consumer materials. Typically, recycling post-industrial material is thought of as less environmentally beneficial because it may indirectly encourage inefficient manufacturing processes that produce waste. In general, though, the use of recyclable materials is environmentally preferable over virgin minerals or natural resources.

The feasibility of applying recyclable materials to mineral wool production is surprising, considering the composite nature and the disparate characteristics of various recyclable materials and their components. In the present mineral wool and related production process, post-industrial and post-consumer recyclable materials make up a majority of the starting ingredients. Trace amounts of virgin mineral may also be included, although preferably this natural resource is totally replaced by the recyclables. The resulting mineral wool is high in recycled material content, which makes the present product more desirable than conventional mineral wool.

In the present application, "post-industrial" refers to recyclable materials obtained from manufacturing waste. Scrap materials capable of being reclaimed within their respective generating processes do not qualify as recyclable materials. "Post-consumer" recyclable materials are defined as waste materials generated by households or by commercial, industrial and institutional facilities in their role as end-users of a product, which can no longer be used for their intended purpose. Post-consumer materials include concrete obtained through rebuilding of roads or demolition of buildings. LEED Certification promotes design and construction practices that increase profitability while reducing the negative environmental impacts of buildings and improving occupant health and well-being.

As discussed above, the acid-to-base ratio is a target parameter of mineral wool production. An acid to base ratio (A/B) of the present mineral wool is defined by the ratio of aluminum oxide and silica to calcium oxide and magnesium oxide:

$$\frac{Al_2O_3 + SiO_2}{CaO + MgO}$$

The present mineral wool is designed to have an A/B ratio that falls within a specified range. Individual components are analyzed for their chemical compositions, from which the chemical composition of the starting materials as a whole can be calculated. A recyclable material can be used in combination with another recyclable material, several other recyclable materials, a virgin mineral, or a combination of virgin minerals to make the present mineral wool. The A/B ratio is preferred to fall in a range from 1.0 to 1.5, and more preferably from 1.01 to 1.15. More preferably, the A/B ratio is preferred to fall within the range of 1.0 to 1.3. More preferably, the A/B ratio is within the range of 1.0 to 1.2.

The moisture content of post-consumer concrete, also referred to as Loss on Ignition (LOI) does not impede its performance as an ingredient of mineral wool. In some cases the concrete has an LOI value as high as 32%. As shown in Table 2, this LOI is two orders of magnitude higher than the other common starting materials. The exact reason for this high LOI is unknown, but it may be a result of losing bound water in the concrete or calcining materials within the concrete itself.

Conventionally, mineral wool manufacturers avoid using composite materials, such as concrete, because of their perceived unstable nature. Surprisingly, post-consumer concrete has been found to be satisfactorily stable and very effective as a LEED RC value modifier. Producers of mineral wool also generally avoid materials that include high percentages of "fines" or smaller particles which tend to clog the cupolas and impede production. It is preferred that the post-consumer concrete in the present product and method include a sufficient number of concrete particles that are approximately 5 to 10 cm (2" to 4") in length and approximately 7.5 to 15 cm (3" to 6") in width to accommodate particle-size-sensitive cupolas. However, embodiments of the present mineral wool and method of manufacture are not limited to cupola operations. For example, operations in an electric furnace or a submerged combustion melting furnace are also considered suitable, and smaller size particles, including fines, would then be acceptable.

The starting materials optionally include one or more of furnace slag, brick chips obtained from post-industrial and/or post-consumer sources, waste glass, foundry sand, virgin minerals and combinations thereof. Suitable virgin minerals include quartzite and granite obtained from geologic formations. Virgin minerals may also be referred to as natural rock or trace minerals. It is contemplated that a single composition of the present mineral wool would not include all of the following materials. Table 1 lists some optional starting materials, along with the percentage by dry weight that each starting material may constitute.

TABLE 1

| Starting Material | Percentage by Dry Weight |
|---|---|
| Post-Consumer Concrete | 13-84% |
| Furnace Slag | 20-90% |
| Brick Chips (Post Consumer and/or Post Industrial) | 5-12% |
| Virgin Minerals | 2-4% |
| Waste glass | 10-30% |
| Foundry sand | 5-22% |

Table 2 displays the oxide analysis of post-consumer concrete samples from Vulcan Materials Company located in Lake Bluff, Ill. and post-consumer brick sold under the identification of "A" Brick Chips from FeHog LLC Environmental Services of Chicago, Ill. Also shown are the oxide analysis of several other starting materials that are contemplated to be feasible in the present mineral wool production, including waste glass and foundry sand.

Waste glass comes in many forms, colors, chemistries and grades. Sources include any glass related manufacturing industry, commercial or industrial reclamation, and municipal waste collection. Preferably, the present waste glass is a post-consumer recyclable material as this provides the greatest contribution to the LEED RC credit calculation.

Chemistry is the primary criteria for selection of waste glass as a starting material for the present mineral wool. Clear glass from a residential recyclable material stream was analyzed and is expected to be an appropriate material. Brown glass is also contemplated as a starting material. Pyrex glass, borosilicate glass, mirrors and crystal are avoided due to their chemical compositions including boron.

Waste foundry sand is a by-product of the foundry casting process of ferrous and nonferrous metals. The majority, up to 95%, of this material is generated from the ferrous casting process. The automotive industry and its suppliers are the primary generators of this material. Calculations of chemical composition and A/B ratios were completed according to methods described herein, utilizing pulverized casting molds from Resource Recovery Corporation of America, Coopersville, Mich. This material is expected to be compatible with the present mineral wool production. Unbroken molds are preferred for cupola operations.

TABLE 2

| Oxide Cmpnd | Brick Chips Post-Industrial | Brick Chips Post-Consumer | Concrete Post-Consumer | Slag | Waste Glass | Foundry Sand | Granite | Quartzite |
|---|---|---|---|---|---|---|---|---|
| $SiO_2$ | 63.14 | 49.55 | 21.83 | 36.8 | 71.45 | 91.84 | 71.52 | 97.65 |
| $Al_2O_3$ | 28.25 | 44.26 | 2.79 | 9.26 | 2.11 | 2.74 | 14.54 | 1.20 |
| $Fe_2O_3$ | 1.95 | 1.59 | 1.75 | 0.25 | 0.08 | 1.23 | 2.41 | 0.49 |
| MgO | 0.69 | 0.44 | 12.20 | 12.0 | 0.07 | 0.18 | 0.37 | 0.01 |
| CaO | 0.19 | 0.16 | 27.67 | 39.2 | 11.52 | 0.28 | 1.72 | 0.01 |
| $Na_2O$ | 0.23 | 0.14 | 0.35 | 0.34 | 13.04 | 0.35 | 3.05 | 0.05 |

TABLE 2-continued

| Oxide Cmpnd | Brick Chips Post-Industrial | Brick Chips Post-Consumer | Concrete Post-Consumer | Slag | Waste Glass | Foundry Sand | Granite | Quartzite |
|---|---|---|---|---|---|---|---|---|
| $K_2O$ | 2.46 | 1.18 | 0.55 | 0.36 | 0.19 | 1.01 | 5.58 | 0.03 |
| $TiO_2$ | 1.80 | 2.15 | 0.16 | 0.58 | 0.08 | 0.06 | 0.26 | 0.08 |
| $P_2O_5$ | 0.01 | 0.12 | 0.05 | 0.01 | 0.03 | 0.01 | 0.08 | 0.01 |
| $Mn_2O_3$ | 0.01 | 0.01 | 0.07 | 0.52 | 0.01 | 0.02 | 0.03 | 0.01 |
| $Cr_2O_3$ | 0.02 | 0.02 | 0.01 | 0.01 | 0.01 | 0.01 | 0.01 | 0.01 |
| LOI | 0.31% | 0.21% | 32% | 0% | 0.18% | 2.19% | 0.36% | 0.39% |
| A/B ratio | 103.85 | 156.35 | 0.62 | 0.9 | 6.3 | 206 | 41.18 | 4942.50 |

As shown in Table 2, the post-consumer concrete material has an A/B ratio less than 1, which is similar to slag. To use post-consumer concrete and remain within the targeted A/B ratio range of 1.00 to 1.20, a combination of quartzite and/or brick chips is preferably used to balance the resulting mineral wool chemistry. Mineral wool chemistry is a term that indicates the acid to base (A/B) ratio of the spun fibrous wool material. In the present manufacturing process, steps are taken to obtain a preferred ratio.

The A/B ratio of the brick chips exceeds 100. Thus, a relatively small amount of brick chips in the starting materials maintains the target A/B ratio when utilizing large quantities of slag, concrete, or other materials with a low A/B ratio. The present post-consumer brick chip starting material offers potential in reducing the amount of post-consumer concrete needed to make significant improvements in the LEED Recycled Contribution value of mineral wool.

By augmenting the starting materials and, in particular, replacing virgin minerals with recyclable materials, preferably post-consumer concrete, post-consumer brick chips or a combination of these, mineral wool produced by the present method increases the LEED RC attributable to the final mineral wool product. LEED Credits are calculated using the following formula:

LEED RC=$X$+(0.5×$Y$).

In this formula, LEED RC is the LEED recycled contribution, commonly known as LEED Credits, X represents the percentage of post-consumer recycled content, and Y represents the percentage of post-industrial recycled content. It is preferable to use post-consumer concrete sourced locally from building and highway demolition projects, reclaimed concrete, prepared concrete (i.e., crushed, cleaned, and graded), or the like. "Prepared" concrete represents an abundant/consistant source available commonly throughout the country (i.e., IDOT specification, ASTM D-448-08).

Tables 3-4 list various ratios of starting materials that are expected to render a mineral-wool fiber product with a suitable A/B ratio. The percentages are on a dry weight basis. Solver Add-In® tool for Microsoft Excel® spreadsheet program was used to calculate the values in Table 3 based on theoretical constraints set in accordance with desired A/B ratios and known oxide analyses. The starting materials shown in Tables 3 and 4 include recyclable post-industrial brick chips, recyclable post-consumer concrete, slag, and virgin mineral quartzite.

TABLE 3

| Formula | Brick Chips Post-Industrial | Concrete Post-Consumer | Slag | Quartzite | A/B Ratio | LEED RC |
|---|---|---|---|---|---|---|
| Current | 2.2% | 0.0% | 94.0% | 3.8% | 1.020 | 48.1 |
| Theoretical Max | 13.2% | 83.0% | 0.0% | 3.8% | 1.090 | 89.6 |
| 80 | 11.4% | 63.8% | 21.0% | 3.8% | 1.090 | 80.0 |
| 75 | 10.5% | 53.8% | 31.9% | 3.8% | 1.090 | 75.0 |
| 70 | 9.6% | 43.8% | 42.8% | 3.8% | 1.090 | 70.0 |
| 65 | 8.7% | 33.8% | 53.7% | 3.8% | 1.090 | 65.0 |
| 60 | 7.8% | 23.8% | 64.6% | 3.8% | 1.090 | 60.0 |
| 55 | 6.8% | 13.8% | 75.6% | 3.8% | 1.090 | 55.0 |
| 50 | 5.9% | 3.8% | 86.5% | 3.8% | 1.090 | 50.0 |

TABLE 4

| Formula | Brick Chips Post-Industrial | Concrete | Slag | Quartzite |
|---|---|---|---|---|
| Current | 2.2% | 0.0% | 94.0% | 3.8% |
| Theoretical Max | 9.5% | 87.8% | 0.0% | 2.7% |
| 80 | 8.8% | 72.2% | 16.2% | 2.9% |
| 75 | 8.4% | 63.1% | 25.5% | 3.0% |
| 70 | 7.9% | 53.4% | 35.5% | 3.2% |
| 65 | 7.5% | 42.9% | 46.4% | 3.3% |
| 60 | 7.0% | 31.5% | 58.1% | 3.4% |
| 55 | 6.4% | 19.1% | 70.9% | 3.6% |
| 50 | 5.8% | 5.5% | 84.9% | 3.7% |

With the oxide analyses of these materials known, a mathematical model was developed to formulate mineral fiber blends that include post-consumer concrete, slag and brick chips. These three materials were chosen because all three of these materials are either post-consumer or post-industrial in nature. In essence, the use of these three materials optionally produces a 100% recyclable mineral fiber. It is contemplated that post-consumer brick chips preferably replace the post-industrial brick chips to provide an improved LEED Credit score for the present mineral wool.

During trials, the blends of materials were limited to three constituents due to the setup of the existing mineral fiber manufacturing operations. As the operations existed at the time the trials were run, four total bin feeders added materials to the cupola. The materials included coke (cupola fuel), slag, post-industrial brick chips and quartzite. To incorporate post-consumer concrete in the plant trials, one of these materials needed to be emptied from the bin feed system and replaced with the selected recyclable material, post-consumer concrete. Since quartzite is a virgin material, it was the natural choice for exclusion. However, if long-term use of concrete is desired, the addition of another storage bin and feeder is suggested for dedication to post-consumer concrete.

To form the mathematical formulation model, the Solver Add-In® tool for Microsoft Excel spreadsheet program was used, as previously stated. Using this tool, the model was designed to optimize the mineral fiber blend for a particular target variable while obeying certain constraints. Specifically, constraints were provided for the amounts of individual oxides, the A/B ratio, combined $SiO_2+Al_2O_3$ and combined $CaO+MgO$. The constraints used in the model are provided in Table 5 and were developed by stringent limits provided in USG guidelines based on International Man Made Vitreous Fiber Standards.

TABLE 5

| Constraint | Lower Limit | Upper Limit |
| --- | --- | --- |
| SiO2 | 36.00 | 44.00 |
| Al2O3 | 8.00 | 14.00 |
| Fe2O3 | 0.00 | 3.00 |
| MgO | 4.00 | 13.00 |
| CaO | 32.00 | 44.00 |
| Na2O | 0.00 | 1.50 |
| K2O | 0.00 | 1.50 |
| TiO2 | 0.00 | 1.50 |
| P2O5 | 0.00 | 0.50 |
| Mn2O3 | 0.00 | 0.60 |
| Cr2O3 | 0.00 | 0.01 |
| A/B Ratio | 1.00 | 1.20 |
| SiO2 + Al2O3 | 0.00 | 53.00 |
| CaO + MgO | 44.00 | 100.00 |

Tables 6 and 7 list percentages of post-consumer concrete, slag and granite starting materials that result in a mineral wool fiber having a suitable A/B ratio. The formula options of Table 6 correspond to the formula options of Table 7.

TABLE 6

| Formula Options | Concrete Post-consumer | Slag | Granite | A/B Ratio | LEED RC |
| --- | --- | --- | --- | --- | --- |
| Current | 0.0% | 92.4% | 7.6% | 1.036 | 46.2 |
| Theoretical Max | 81.6% | 0.0% | 18.4% | 1.090 | 81.6 |
| 80 | 78.0% | 4.0% | 18.0% | 1.090 | 80.0 |
| 75 | 66.9% | 16.1% | 16.9% | 1.090 | 75.0 |
| 70 | 55.8% | 28.3% | 15.8% | 1.090 | 70.0 |
| 65 | 44.8% | 40.5% | 14.8% | 1.090 | 65.0 |
| 60 | 33.7% | 52.6% | 13.7% | 1.090 | 60.0 |
| 55 | 22.6% | 64.8% | 12.6% | 1.090 | 55.0 |
| 50 | 11.5% | 76.9% | 11.5% | 1.090 | 50.0 |

TABLE 7

| Formula Options | Concrete post-consumer | Slag | Granite |
| --- | --- | --- | --- |
| Current | 0.0% | 92.4% | 7.6% |
| Theoretical Max | 86.7% | 0.0% | 13.3% |
| 80 | 83.9% | 2.9% | 13.2% |
| 75 | 74.8% | 12.3% | 12.9% |
| 70 | 65.0% | 22.4% | 12.5% |
| 65 | 54.4% | 33.4% | 12.2% |
| 60 | 42.8% | 45.4% | 11.8% |
| 55 | 30.0% | 58.6% | 11.4% |
| 50 | 16.1% | 73.0% | 10.9% |

Tables 8 and 9 list ratios of starting materials that include post-industrial brick chips, slag, virgin mineral, and a low-to-moderate proportion of concrete by dry weight. The formula number is the same as the LEED RC value. Table 7 shows compositions of starting materials that include post-industrial brick chips, post-consumer concrete, slag and quartzite. Table 8 shows compositions of slightly different starting materials that provide the same LEED RC values.

TABLE 8

| Formula | Brick Chips Post-Industrial | Concrete Post-Consumer | Slag | Quartzite | A/B Ratio | Fiber LEED RC |
| --- | --- | --- | --- | --- | --- | --- |
| 50 | 5.9% | 3.8% | 86.5% | 3.8% | 1.090 | 50 |
| 51 | 6.1% | 5.8% | 84.3% | 3.8% | 1.090 | 51 |
| 52 | 6.3% | 7.8% | 82.1% | 3.8% | 1.090 | 52 |
| 53 | 6.5% | 9.8% | 79.9% | 3.8% | 1.090 | 53 |
| 54 | 6.7% | 11.8% | 77.7% | 3.8% | 1.090 | 54 |
| 55 | 6.8% | 13.8% | 75.6% | 3.8% | 1.090 | 55 |

TABLE 9

| Formula | Brick Chips Post-Industrial | Concrete Post-Consumer | Slag | Quartzite |
| --- | --- | --- | --- | --- |
| 50 | 5.8% | 5.5% | 84.9% | 3.7% |
| 51 | 6.0% | 8.3% | 82.0% | 3.7% |
| 52 | 6.1% | 11.1% | 79.2% | 3.7% |
| 53 | 6.2% | 13.8% | 76.4% | 3.6% |
| 54 | 6.3% | 16.4% | 73.6% | 3.6% |
| 55 | 6.4% | 19.1% | 70.9% | 3.6% |

Table 10 shows ratios of starting materials that include only post-industrial brick chips and post-consumer concrete. This formulation utilizes high concentrations of concrete and enables a manufacturer to achieve a high LEED RC value while maintaining target A/B ratios. Also, it is seen that brick chips may be a substitute for recyclable concrete, although the A/B ratio increases.

TABLE 10

| Formula | Brick Chips | Concrete | A/B Ratio |
| --- | --- | --- | --- |
| 93.0 | 14.0% | 86.0% | 1.00 |
| 91.0 | 18.0% | 82.0% | 1.14 |
| 89.5 | 21.0% | 79.0% | 1.25 |
| 88.5 | 23.0% | 77.0% | 1.33 |
| 88.0 | 24.0% | 76.0% | 1.49 |

Table 11 shows theoretical ratios of starting materials that include post-consumer concrete over a wide range of concentrations. Table 12 shows theoretical batch formulas of Table 11, but taking LOI of concrete into account. The A/B ratio is maintained in the range of 1.0-1.5 for calculating these theoretical values.

TABLE 11

| Formula | Concrete Post-Consumer | Slag | Granite | A/B ratio | LEED RC |
| --- | --- | --- | --- | --- | --- |
| current | 0 | 92.4% | 7.6% | 1.036 | 46.2 |
| Theoretical Max | 81.6% | 0.0% | 18.4% | 1.09 | 81.6 |
| 80 | 78.0% | 4.0% | 18.0% | 1.09 | 80 |
| 75 | 66.9% | 16.1% | 16.9% | 1.09 | 75 |
| 70 | 55.8% | 28.3% | 15.8% | 1.09 | 70 |
| 65 | 44.8% | 40.5% | 14.8% | 1.09 | 65 |

TABLE 11-continued

| Formula | Concrete Post-Consumer | Slag | Granite | A/B ratio | LEED RC |
|---|---|---|---|---|---|
| 60 | 33.7% | 52.6% | 13.7% | 1.09 | 60 |
| 55 | 22.6% | 64.8% | 12.6% | 1.09 | 55 |
| 50 | 11.5% | 76.9% | 11.5% | 1.09 | 50 |

TABLE 12

| Formula | Concrete Post-Consumer | Slag | Granite |
|---|---|---|---|
| Current | 0.0% | 92.4% | 7.6% |
| Theoretical Max | 86.7% | 0.0% | 13.3% |
| 80 | 83.9% | 2.9% | 13.2% |
| 75 | 74.8% | 12.3% | 12.9% |
| 70 | 65.0% | 22.4% | 12.5% |
| 65 | 54.4% | 33.4% | 12.2% |
| 60 | 42.8% | 45.4% | 11.8% |
| 55 | 30.0% | 58.6% | 11.4% |
| 50 | 16.1% | 73.0% | 10.9% |

In one embodiment the mathematical model calculated amounts of starting materials for a targeted A/B ratio ("Model A/B Ratio") equal to 1.056 and a 5% post-consumer concrete mixture. Table 13 below shows the starting material blends expressed in terms of the "mineral amounts" and the "batch input formulation." The "mineral amounts" corresponds to the resulting mineral usage rates following the LOI reduction of the materials going into the cupola, while the "batch input formulation" corresponds to the weight percentage of materials going into a cupola before ignition. A second blend of starting materials included 10% post-consumer concrete. See Table 13 below. The same definitions of the terms "mineral amounts" and "batch input formulation" apply.

TABLE 13

| | Brick Chips Post-Industrial | Concrete post-consumer | Slag | Model A/B Ratio |
|---|---|---|---|---|
| Mineral Amounts | 9.0% | 5.1% | 85.9% | 1.059 |
| Batch Input Formulation | 8.8% | 7.3% | 83.9% | 1.05 |

TABLE 14

| | Brick Chips Post-Industrial | Concrete post-consumer | Slag | Model A/B Ratio |
|---|---|---|---|---|
| Mineral Amounts | 9.6% | 10.1% | 80.3% | 1.05 |
| Batch Input Formulation | 9.2% | 14.2% | 76.6% | 1.05 |

Resulting fiber characteristics were evaluated. Table 15 displays the physical characteristics of the trial fiber and Table 16 displays the chemical analysis of the fiber as determined by Walworth's XRF. The fiber typically had a slightly larger fiber diameter (4.5-5.6 microns) when compared to the control (4.6 microns). With regard to shot content, the trial materials were shown to have a lower overall shot content when compared to the control. However, it should be noted that the trial may have run slower than the control, which would also impact the overall shot content. The micronaire value was slightly higher than the control, which indicates a higher porosity per a given weight basis.

With regard to the chemical analysis shown in Table 14, the A/B ratio of the trial materials were close to the control material and within the acceptable A/B ratio range of USG mineral fiber. While the A/B ratio was higher than the model predicted, it was still relatively close and within a safe range for product usage. This material met all of the standard requirements for USG mineral fiber and was successfully utilized in production of Sandstone™ without any production related issues observed.

TABLE 15

| Time | Material | LOI % | Diameter (microns) | 50 mesh | 100 mesh | 200 mesh | 325 mesh | Total shot % | Micronaire |
|---|---|---|---|---|---|---|---|---|---|
| 10:13 | Control | 2.18 | 4.6 | 12.9 | 19.8 | 21.4 | 6 | 60.1 | 3.2 |
| 11:00 | Transitional Material | 1.78 | 4.7 | 13.5 | 16.7 | 8.7 | 6.2 | 45.4 | 3.7 |
| 11.35 | 5% concrete | 1.91 | 4.5 | 11.5 | 11.2 | 8.2 | 3.5 | 34.3 | 4 |
| 12:00 | 5% concrete | 1.75 | 5.3 | 11.3 | 17.3 | 10.5 | 0.5 | 39.6 | 4.1 |
| 12:55 | 10% | 0.72 | 5.2 | 17.5 | 13.5 | 8.0 | 2.7 | 41.7 | 5.7 |
| 1:36 | 10% | 0.58 | 5.6 | 13.7 | 14.6 | 9.9 | 5.0 | 43.2 | 4.4 |

TABLE 16

| Time | Material | Mg | Al | Si | S | K | Ca | Fe | Acid | Base | A/B |
|---|---|---|---|---|---|---|---|---|---|---|---|
| 10:13 | Control | 10.31 | 9.21 | 41.43 | 0.48 | 0.44 | 35.49 | 0.33 | 50.63 | 45.80 | 1.11 |
| 11:35 | 5% concrete | 10.20 | 10.26 | 40.86 | 0.44 | 0.55 | 34.64 | 0.42 | 51.11 | 44.85 | 1.14 |
| 12:55 | 10% concrete | 10.05 | 9.86 | 40.87 | 0.38 | 0.63 | 33.95 | 0.55 | 50.73 | 44.00 | 1.15 |

TABLE 16-continued

| Time | Material | Mg | Al | Si | S | K | Ca | Fe | Acid | Base | A/B |
|---|---|---|---|---|---|---|---|---|---|---|---|
| 13:37 | 10% concrete | 10.48 | 9.78 | 40.76 | 0.42 | 0.59 | 34.63 | 0.48 | 50.54 | 45.11 | 1.12 |

In another embodiment, the mathematical model was set to target formulations of 10% and 15% post-consumer concrete. Because the actual A/B ratio of the first embodiment was shown to be above the value predicted by the model, the model target was lowered when formulating the blends for this embodiment. The charge cycle time increased over the control in this embodiment as well. Table 17 below shows the starting material blends expressed in terms of the "mineral amounts" and the "batch input formulation" including 15% post-consumer concrete. A second blend of starting materials included 20% post-consumer concrete. See Table 16 below.

TABLE 17

| | Brick Chips Post-Industrial | Concrete post-consumer | Slag | Model A/B Ratio |
|---|---|---|---|---|
| Mineral Amounts | 8.0% | 15.0% | 77.0% | 1.010 |
| Batch Input Formulation | 7.5% | 20.6% | 71.9% | 1.010 |

TABLE 18

| | Brick Chips Post-Industrial | Concrete post-consumer | Slag | Model A/B Ratio |
|---|---|---|---|---|
| Mineral Amounts | 8.9% | 20.0% | 71.1% | 1.010 |
| Batch Input Formulation | 8.2% | 26.9% | 64.9% | 1.010 |

The resulting mineral wool fibers had properties as described in Tables 19 and 20. The fiber diameters were larger and the total shot content was generally comparable or less than the control materials. It is believed that the decrease in shot content is related to slower running of the cupola compared to standard production. The fiber was within the acceptable A/B ration range of 1.00 to 1.20. The fibers' actual A/B ratio was, again, higher than the model prediction by approximately 0.11 to 0.15. Thus, it is contemplated that future models will be created with this offset in mind.

TABLE 19

| Condition | Time | LOI % | Fiber Diameter | 50 mesh | 100 mesh | 200 mesh | 325 mesh | Total shot | Micronaire |
|---|---|---|---|---|---|---|---|---|---|
| Pre-trial | 9:09 | 0.21 | 3.6μ | 15.1 | 23 | 13.6 | 5.9 | 57.5 | 3.9 |
| Pre-trial | 10:09 | 0.22 | 3.8 | 13.3 | 16.2 | 10.7 | 4.0 | 44.2 | 4.3 |
| 15% Concrete | 12:27 | 0.28 | 4.7 | 14.1 | 15.1 | 8.2 | 7.7 | 45.1 | 5.4 |
| 20% Concrete | 1:45 | 0.61 | ?? | 8.7 | 13.9 | 9.7 | 8.6 | 41.2 | 3.5 |
| 20% Concrete | 2:36 | 0.42 | 5.2 | 20.1 | 15.3 | 9.7 | 1.78 | 46.9 | 5.2 |

TABLE 20

| Condition | Time | Fe | Ca | K | S | Si | Al | Mg | A/B |
|---|---|---|---|---|---|---|---|---|---|
| Pre-trial | 10:09 | 0.39 | 35.378 | 0.434 | 0.501 | 40.734 | 9.831 | 10.38 | 1.105 |
| 15% concrete | 12:27 | 0.647 | 34.046 | 0.616 | 0.305 | 40.824 | 9.652 | 10.483 | 1.134 |
| 20% concrete | 13:45 | 0.653 | 34.245 | 0.605 | 0.312 | 40.883 | 9.687 | 10.612 | 1.127 |
| 20% concrete | 14:36 | 0.618 | 33.705 | 0.649 | 0.637 | 40.901 | 9.629 | 10.252 | 1.15 |

While a reduction in mineral fiber production throughput was observed in the embodiments described above, the LEED RC potential of this fiber is expected to pay for the increased production cost.

Table 21 shows a proposed mineral fiber blend incorporating post-consumer brick chips. Selecting recyclable brick that is post-consumer is expected to offer a significant reduction in the required post-consumer concrete usage. A 60% LEED RC fiber is expected to be obtained with a significant improvement in the cupola throughput rate for a high LEED RC mineral fiber. The utilization of this post-consumer brick chips requires only 12.6% concrete minerals to achieve a 60% LEED RC fiber, compared to 20% concrete minerals required when using a post-industrial brick source. There is potential that this concrete usage may not be as detrimental to the manufacturing operations.

TABLE 21

|  | Post-Consumer Brick Chips | Concrete | Slag | Quartzite | A/B Ratio |
|---|---|---|---|---|---|
| Amounts | 7.4% | 12.6% | 80.0% | 0.0% | 1.0 |

A method for forming the present mineral wool includes combining several starting materials, including recyclable concrete and recyclable brick chips. The combined starting materials are processed to form a mineral wool product having an acid-to-base ratio in a predetermined range. It is contemplated that virgin minerals can be avoided all together and mineral wool can be spun from recyclable concrete and recyclable brick chips alone. It is further contemplated that recyclable glass or recyclable foundry sand may be utilized in the manufacture of mineral wool.

In another embodiment, a method for forming a mineral wool product includes combining post-consumer recyclable concrete, constituting a percentage by dry weight of the starting materials in the range of 12%-84%, and trace minerals, which constitute a percentage by dry weight of the starting materials in the range of 2%-4%. The starting materials are mixed and then heated to form a liquid. The liquid is blown to form a mineral wool product having an acid-to-base ratio (A/B) within the range of 1.0 to 1.5, as described above.

In yet another embodiment, a method for forming a mineral wool includes combining a plurality of starting materials. A feature of the present method is that the starting materials include post-consumer recyclable materials, preferably post-consumer concrete, post-consumer or post-industrial brick chips, a combination of post-consumer materials, or a combination of post-consumer and post-industrial materials. A typical source of post-consumer concrete is debris from road construction and building demolition projects. The post-consumer concrete is relatively free of contaminants such as wire mesh, reinforcing bars (rebar) and asphalt. A typical source of post-consumer brick chips is refractory brick waste.

Once the starting materials are selected, they are processed to form a mineral-wool product using conventional techniques, such as those described in U.S. Pat. Nos. 2,020,403; 4,720,295; and 5,709,728, all of which are incorporated by reference. The combined ingredients have an acid-to-base (A/B) ratio in a predetermined range. It is preferred that the A/B ratio is $$\frac{Al_2O_3 + SiO_2}{CaO + MgO},$$

and the predetermined ratios range from 1.0 to 1.5, and more preferably from 1.0 to 1.2, more preferably from 1.01 to 1.15.

Upon combination, the ingredients are conveyed into a suitable furnace, such as a cupola, and heated to a temperature in the range of 1,400° C. to 2,000° C., then blown, with air or steam, to form the mineral wool fiber as is known in the art. This invention is not limited to a cupola type furnace. Other furnaces, such as an electric furnace or a submerged combustion melting furnace would work just as well. Material used in a cupola requires specific product sizing to allow proper bed breathing and combustion air flow. Electric furnaces or submerged combustion melting furnaces accommodate materials that are any size, down to the size of grains of sand. Typical cupola sizing would be 7.5-10 cm (3-4 inches)/10-15 cm (4-6 inches).

The present mineral wool is particularly well suited for application in products including, for example, acoustical panels, structural panels, loose mineral wool and batts of mineral wool. Panels are often utilized as ceiling panels in buildings such as homes and offices where sound attenuation is desired.

While particular embodiments of the present mineral wool, related product, and related method for production have been described herein, it will be appreciated by those skilled in the art that changes and modifications may be made without departing from the invention in its broader aspects and as set forth in the following claims.

What is claimed:

1. A mineral wool comprising: recycled material, wherein an acid-to-base ratio of said mineral wool is defined as $$\frac{Al_2O_3 + SiO_2}{CaO + MgO},$$

and said mineral wool has the acid-to-base ratio from about 1.0 to about 1.5 by weight; and wherein $SiO_2$ is in the range from 36% to 44% by weight, $Al_2O_3$ is in the range from 8.0% to 14% by weight, MgO is the range from 4% to 13% by weight and CaO is in the range from 32% to 44% by weight; and wherein said mineral wool is made of fibers with a diameter from 4.5 to 5.6 microns.

2. The mineral wool of claim 1 wherein said recycled material is selected from a group consisting of post-industrial recyclable materials, post-consumer recyclable materials or a combination thereof.

3. The mineral wool of claim 2 wherein the recycled material is selected from a group consisting of slag, post-consumer concrete, post-consumer brick chips, post-industrial brick chips, waste glass, foundry sand and combinations thereof.

4. The mineral wool of claim 3, wherein said slag constitutes a percentage by dry weight of the starting materials in the range of 20%-90%.

5. The mineral wool of claim 3, wherein said post-industrial, post-consumer, or a combination of brick chips constitute a percentage by dry weight of the starting materials in the range of 5%-12%.

6. The mineral wool of claim 3, wherein said post-consumer concrete constitutes a percentage by dry weight of the starting materials in the range of 12%-84%.

7. The mineral wool of claim 1 further comprising virgin minerals constituting a percentage by dry weight in the range of 2%-4%.

8. A product comprised of the mineral wool of claim 1, wherein said product includes an acoustic ceiling panel, loose mineral wool and balls of mineral wool.

9. A mineral wool comprising: recycled material, wherein an acid-to-base ratio of said mineral wool is defined as $$\frac{Al_2O_3 + SiO_2}{CaO + MgO},$$

and said mineral wool has the acid-to-base ratio from about 1.0 to about 1.5 by weight, and said mineral wool further has the LEED RC (LEED Recycled Contribution) value of at least 46%, wherein said LEED RC value is calculated by using the following formula:

LEED RC=X+(0.5×Y), in which X represents the percentage of post-consumer recycled content, and Y represents the percentage of post-industrial recycled content; and wherein $SiO_2$ is in the range from 36% to 44% by weight, $Al_2O_3$ is in the range from 8.0% to 14% by weight, MgO is the range from 4% to 13% by weight and CaO is in the range from 32% to 44% by weight; and wherein said mineral wool is made of fibers with a diameter from 4.5 to 5.6 microns.

10. The mineral wool of claim 9, wherein the recycled material is selected from a group consisting of post-industrial recyclable materials, post-consumer recyclable materials, slag, post-consumer concrete, post-consumer brick chips, post-industrial brick chips, waste glass, foundry sand and combinations thereof.

* * * * *